United States Patent [19]

Hattori et al.

[11] Patent Number: 4,457,742

[45] Date of Patent: Jul. 3, 1984

[54] TORQUE TRANSMISSION BELT MEANS

[75] Inventors: Yoshiyuki Hattori, Toyoake; Kazuma Matsu, Toyohashi; Hiroji Kinbara, Aichi, all of Japan

[73] Assignee: Nippondenso Co., Ltd., Kariya, Japan

[21] Appl. No.: 261,937

[22] Filed: May 8, 1981

[30] Foreign Application Priority Data

Jul. 3, 1980 [JP] Japan .................. 55-91444

[51] Int. Cl.³ ..................... F16G 1/00; F16C 1/22
[52] U.S. Cl. ..................... 474/201; 474/242
[58] Field of Search .............. 474/204, 206, 207, 242, 474/265

[56] References Cited

U.S. PATENT DOCUMENTS

| | | | |
|---|---|---|---|
| 1,956,472 | 4/1934 | Penn | 305/43 |
| 2,403,607 | 7/1946 | Ogard | 474/242 |
| 3,720,113 | 3/1973 | Van Doorne et al. | 474/242 |
| 3,949,621 | 4/1976 | Beusink et al. | 474/201 |
| 4,177,687 | 12/1979 | Russ, Sr. | 474/242 |
| 4,213,350 | 7/1980 | Horowitz et al. | 474/264 |
| 4,299,586 | 11/1981 | Van der Hardt Abeson | 474/201 |
| 4,303,403 | 12/1981 | Lamers | 474/201 |
| 4,342,561 | 8/1982 | Braybrook | 474/242 |

FOREIGN PATENT DOCUMENTS 1335520 4/1962 France .................. 474/207

Primary Examiner—Lawrence J. Staab
Assistant Examiner—Dwight G. Diehl
Attorney, Agent, or Firm—Cushman, Darby & Cushman

[57] ABSTRACT

A torque transmission belt means comprises a metallic ring which extends around a driving pulley and a driven pulley and a plurality of blocks made of hard material, which are linked up by the ring so as to be shiftably engaged therewith. Each block is provided with a concave portion in the front surface or the rear surface in the moving direction of the ring and an elastic member is fixed to the front surface or the rear surface of a back plate portion of each block, which forms a bottom of the concave portion so that each elastic member is contacted with the back plate portion of the adjacent block. Since each block is contacted with the adjacent blocks through the elastic members, the torque transmission belt means silently operates.

12 Claims, 16 Drawing Figures

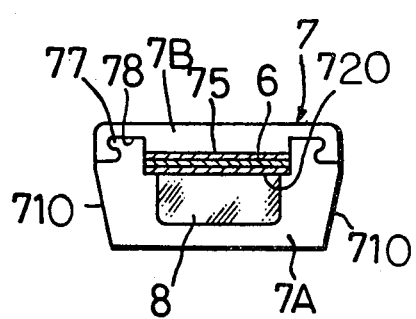
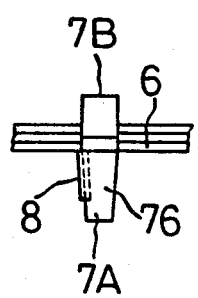
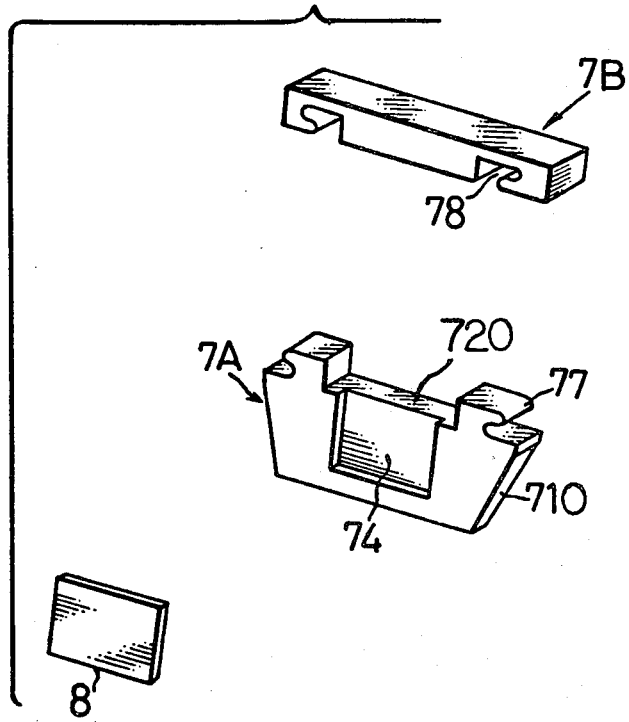

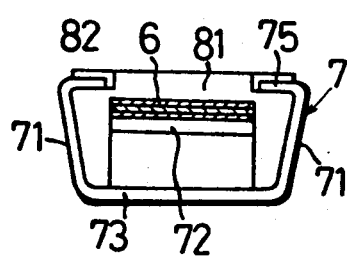
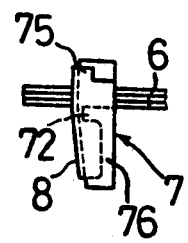
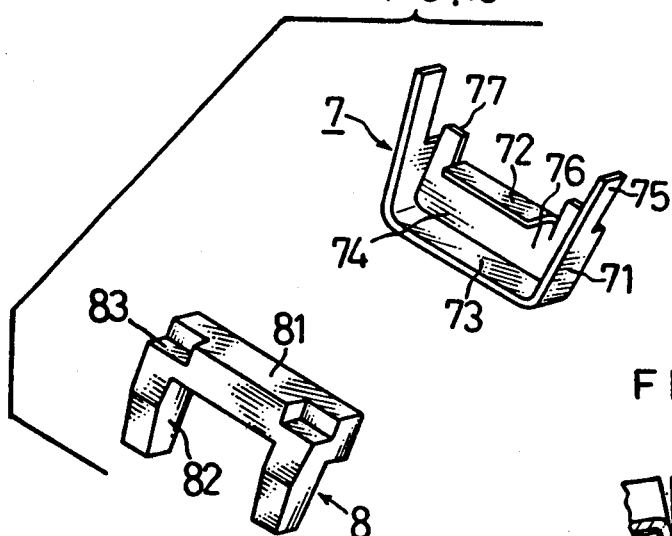
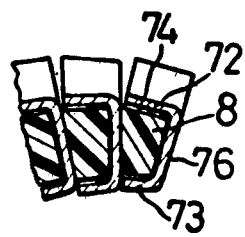

TORQUE TRANSMISSION BELT MEANS

BACKGROUND OF THE PRESENT INVENTION

The present invention relates to a torque transmission belt means which is extended around a pulley positioned in the driving side and a pulley positioned in the driven side for transmitting a driving force from the pulley in the driving side to the pulley in the driven side.

Conventionally, one of such a torque transmission belt means comprises a plurality of ring-shaped metallic strips which are piled up each other and a series of metallic blocks which are shiftably engaged with the metallic strips. U.S. Pat. No. 3,720,113 shows an example of such a conventional torque transmission belt means. In the torque transmission belt means of U.S. Pat. No. 3,720,113, either one side or both sides of each of the blocks is bevelled transversely to the direction of movement so that the blocks can tilt with respect to each other when they are entrained around discs (pulleys). And the remaining sides of each of blocks are inclined so as to coincide with the angle of inclination of the discs.

One object of the present invention is to provide an improved torque transmission belt means of the above described type.

Another object of the present invention is to provide a torque transmission belt means of light weight.

Still another object of the present inention is to provide a torque transmission belt means which does not generate noise when blocks thereof are contacted with each other while being operated.

DESCRIPTION OF THE DRAWINGS

Other objects and advantages of the invention will become apparent from the following description of embodiments with reference to the accompanying drawings wherein:

FIG. 10 is a front view of the block 7 of a fourth embodiment of the present invention;

FIG. 11 is a side view of the block 7 of FIG. 10;

FIG. 12 is an exploded perspective view of the block 7 of FIG. 10;

FIG. 13 is a front view of the block 7 of a fifth embodiment of the present invention;

FIG. 14 is a side view of the block 7 of FIG. 13;

FIG. 15 is an exploded perspective view of the block 7 of FIG. 13; and

FIG. 16 is a sectional view of the block 7 of a sixth embodiment of the present invention.

SUMMARY OF THE INVENTION

In the torque transmission belt means of the present invention, each block is provided with a concave portion in the front surface or the rear surface thereof in the moving direction.

And an elastic member is fixed to the front surface or the rear surface of a plate portion of each block, which forms a bottom of the concave portion. The blocks to which the elastic members are fixed respectively are arranged so that each elastic member is contacted with the plate portion of the adjacent block and then the blocks are linked up by a metallic ring.

Since each block is contacted with the adjacent blocks through the elastic members as described above, the torque transmission belt means of the present invention does not generate such noise as to be generated when each block is directly contacted with the adjacent blocks at the operating time of the conventional torque transmission belt means.

Furthermore, since each block is provided with a concave portion, the blocks can be made light so that the torque transmission belt means of the present invention can be rotated at high speed.

DETAILED DESCRIPTION OF THE INVENTION

Hereinafter, the present invention will be explained in accordance with embodiments with reference to the drawings.

Figure 1:
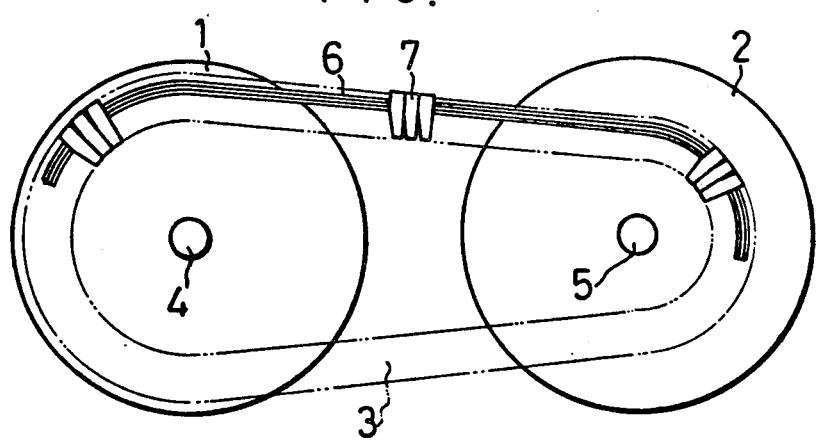
FIG. 1 is a schematic view of a first embodiment of a torque transmission belt means of the present invention.

In FIG. 1, a pulley 1 is positioned in the driving side and connected to a driving shaft 4 of an engine, for example. Thus, the pulley 1 is rotated by a driving force of the engine. And the rotation of the pulley 1 is transmitted to a pulley 2 positioned in the driven side through a torque transmission belt means 3 so that an operating shaft 5 of a gear assembly of an automatic transmission or an auxiliary machinery such as a compressor, an alternator and an air pump is rotated.

The torque transmission belt means 3 is composed of a metallic ring 6 having excellent bending strength and excellent tensile strength and a predetermined number of blocks which are arranged along and linked up by the metallic ring 6.

Figure 2:
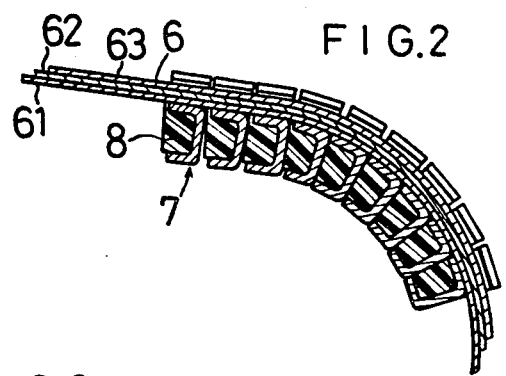
FIG. 2 is a partially enlarged sectional view of FIG. 1.

As shown in FIG. 2, the metallic ring 6 is composed of metal strips 61, 62 and 63 which are piled up one another so as to have sufficiently high strength.

Figure 3:
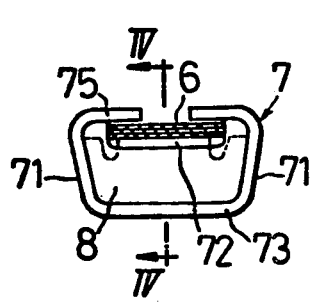
FIG. 3 is a front view of a block 7 shown in FIG. 1.
Figure 4:
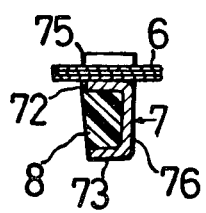
FIG. 4 is a sectional view of the block 7 taken along the line IV—IV of FIG. 3.

As shown in FIGS. 3 and 4, the block 7 is made of a thin walled iron plate and is composed of a pair of side plate portions 71, a lower plate portion 73 which connects the lower ends of the side plate portions 71, a back plate portion 76 which connects one side end of each of the side plate portions 71, a top plate portion 72 which projects in the direction almost parallel with the lower plate portion 73 from the upper end of the back plate portion 76 and projecting portions 75 which project from the upper ends of the side plate portions 71 in the opposed directions to each other for shiftably retaining the ring 6 which is interposed between the top plate portion 72 and the projecting portions 75.

The width 1 of each side plate portions 71 along the moving direction of the torque transmission belt means is gradually decreased toward the inner side of the ring 6.

Within a concave portion formed by the side plate portions 71, the top plate portion 72 and the lower plate portion 73 of the block 7, an elastic member 8 made of elastic material is charged. Rubber or synthetic resin such as nylon is used as the elastic material.

The elastic member 8 is made slightly larger than the depth of the concave portion of the block 7 so that the surface of the elastic member 8 slightly projects from the side end of the side plate portions 71.

Figure 5:
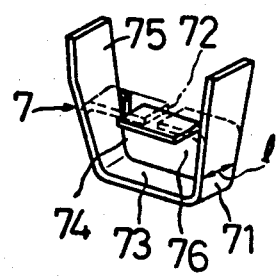
FIG. 5 is a perspective view showing the process of manufacturing the block 7 shown in FIG. 1.

The block 7 is formed by drawing an iron plate. FIG. 5 shows the block 7 which was formed by drawing. Within a concave portion 74, an elastic member 8 is fixedly inserted by adhering, welding or moulding.

The ring 6 is disposed on the top plate portion 72 and is shiftably retained between the top plate portion 72 and projecting portions which are formed by bending the upper end portions of the side plate portions 71 in the opposed directions to each other as shown by alternate long and two short dashes lines.

The surface of the elastic member 8 is contacted with the back plate portion 76 of the adjacent block 7 when the blocks are linked up by the ring 6.

Therefore, when the torque transmission belt means wherein the blocks 7 are linked up by the ring 6 is operated, the blocks 7 do not generate such noise as to be generated when the metallic blocks are contacted with one another. Thus, the torque transmission belt means of the present invention silently operates.

And when the curvature of each of the pulleys 1 and 2 is changed, the ring 6 can be easily deformed according as the change of the curvature of each pulley since the elastic member 8 can be elastically deformed.

Namely, when the torque transmission belt means passes each pulley, the curvature of the ring 6 becomes large so that each elastic member is compressed by the adjacent blocks.

As a result, the rear surface of the back plate portion of each block is directly contacted with the front end surface of the opposed side plate portion of the adjacent block. At this time, the largest transmission torque is obtained. In this case, since each back plate portion is contacted with each side plate portion after each elastic member is compressed, noise is not generated when the blocks are contacted with one another.

And since the block 7 is composed of a thin walled metallic plate and an elastic material, the block 7 of the present invention can be made lighter compared with the conventional metallic blocks so that the torque transmission belt means of the present invention can be rotated at high speed.

Furthermore, the torque transmission belt means can be easily produced by drawing an iron plate, to form the block 7, fixing the elastic member 8 to the block 7 and bending the upper ends of the side plate portions 71 to be linked up by the ring 6.

Since the side plate portions 71 which are contacted with the V-shaped grooves of the pulleys 1 and 2 with high friction, are reinforced by the lower plate portion 73 and the back plate portion 76 which projects at right angles with the side plate portions 71, the block 7 can be sufficiently endure high transmission load applied from the V-shaped grooves of the pulleys 1 and 2.

Figure 6:
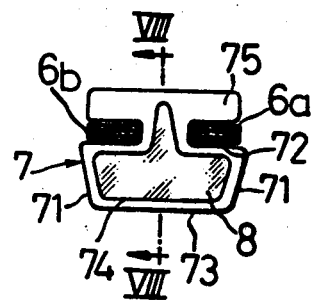
FIG. 6 is a front view of the block 7 of a second embodiment of the present invention.
Figure 7:
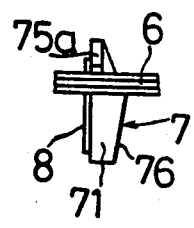
FIG. 7 is a side view of the block 7 of FIG. 6.
Figure 8:
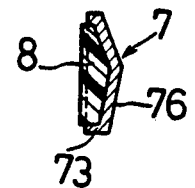
FIG. 8 is a sectional view of the block 7 taken along the line VIII—VIII of FIG. 6.

FIG. 6 to FIG. 8 show a second embodiment of the present invention.

The block 7 of the second embodiment is composed of a base portion comprising side plate portions 71, a top plate portion 72 and a lower plate portion 73, and a letter T-shaped projecting portion 75 which integrally projects from the top plate portion 72 of the base portion.

The block 7 of the second embodiment is obtained by press-forming a metallic plate, for example.

With a concave portion 74 formed in the front side of the back plate portion 76, an elastic member 8 is fixed in the same manner as the first embodiment.

The blocks 7 are linked up by the ring 6a and the ring 6b which are mounted in the grooves formed between the top plate portion 72 and the projecting portion 75 respectively. The block 7 of the second embodiment is not required to be bent for retaining the ring 6a and 6b.

Figure 9:
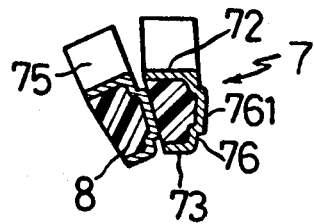
FIG. 9 is a sectional view of the block 7 of a third embodiment of the present invention.

FIG. 9 shows a third embodiment. In the back plate portion 76 of the block 7, an inflating portion 761 which projects backwardly therefrom is formed and the surface of the elastic member 8 which is fixed to the block 7 forms the same plane as the end surface of the block 7.

When the torque transmission belt means of the third embodiment is operated, the inflating portion 761 is contacted with the elastic member 8 of the adjacent block 7.

Other construction and other operation of the second embodiment are the same as those of the first embodiment.

FIG. 10 to FIG. 12 show a fourth embodiment of the present invention. The block 7 is composed of a base member 7A and a ring supporting member 7B. These members 7A and 7B are made of carbon fibers bound by pressing or synthetic resin including carbon fibers as fillers.

In the upper surface of the base member 7A and the lower surface of the ring supporting member 7B, a pair of projecting portions 77 and a pair of grooves 78 are formed respectively to be engaged with each other.

In the base portion 7A, friction surfaces 710 which are contacted with the walls of the V-shaped groove of each pulley in both sides thereof.

And in the central portion of the base member 7A, a concave portion 74 is formed and within the concave portion 74, an elastic member 8 is adhered. The ring 6 is disposed on a top surfce 720. And the ring supporting member 7B is joined with the base member 7A by inserting the projecting portions 77 into the grooves 78 closely. Thus, the ring 6 is mounted in the block 7.

According to the torque transmission belt means of the fourth embodiment, the ring 6 can be easily mounted in the block 7.

FIG. 13 to FIG. 15 show a fifth embodiment of the present invention.

The block 7 is formed by drawing an iron plate. The block 7 is composed of side plate portions 71, projecting portions 75 which project from the upper ends of the side plate portions 76 upwardly, a lower plate portion 73, a back plate portion 76, a top plate portion 72 and projecting portions 77 which project from the upper ends of the sides of the back plate portion 76 upwardly.

And a concave portion 74 is formed between the side plate portions 71.

The elastic member 8 is composed of an edge portion 81 which is formed in the width direction thereof, leg portions 82 which extend underward from both ends of the edge portion 81. And in the front surface of the both ends of the edge portion 81, stepped portions 83 are formed respectively.

The ring 6 is disposed on the top plate portion 72. Then, the edge portion 81 of the elastic member 8 is disposed on the projecting portions 77. And by bending the projecting portions 75 of the block 7 in in the opposed directions to each other and engaging the bent projecting portions 75 with the stepped portions 83 of the elastic member 8, the torque transmission belt means 3 is constructed.

In the torque transmission belt means 3 of the fifth embodiment, the ring 6 is retained between the top plate portion 72 of the block 7 and the edge portion 81 of the elastic member 8.

According to the fifth embodiment, only by placing the block 7, the elastic member 8 and the ring 6 on one another at a predetermined position respectively and bending the projecting portions 75 of the block 7, the block 7 can be connected to the elastic member 8 and the ring 6 can be retained between the block 7 and the elastic member 8. Therefore, the torque transmission belt means 3 of the fifth embodiment can be easily manufactured.

FIG. 16 shows a sixth embodiment of the present invention.

In the torque transmission belt means of the sixth embodiment, the elastic member 8 is fixed to the rear surface of the back plate portion 76 of the block 7. The elastic member 8 has such a size as to move within or out of the concave portion 74 of the adjacent block 7 and has a thickness slightly larger than the depth of the concave portion 74. Therefore, the elastic member 8 is inserted into the concave portion 74 of the adjacent block 7 and the surface of the elastic member 8 is contacted with the surface of the back plate portion 76.

The operation and the effect of the power transmission belt means of the sixth embodiment are the same as those of the first embodiment.

As described above, the torque transmission belt means of the present invention is very light so that the high speed rotation is possible. And also the torque transmission belt means of the present invention operates silently.

Therefore, the torque transmission belt means of the present invention can be effectively applied as an automatic transmission of a vehicle and a means for transmitting the driving force of the engine into the auxiliary machines such as an alternator and a compressor.

Having now fully described the invention, it will be apparent to one of ordinary skill in the art that many changes and modifications can be made thereto without departing from the spirit or scope of the invention as set forth herein.

What is claimed is:

1. A torque transmission belt means which is adapted to be extended along V-shaped grooves formed in a driving pulley and a driven pulley for transmitting the driving force of the driving pulley to the driven pulley, comprising:

a metallic ring which is adapted to be extended along the V-shaped grooves of said driving pulley and said driven pulley;

a series of blocks which are arranged along with said metallic ring so as to be shiftably engaged therewith;

said blocks being made of hard material having high strength, opposed side surfaces which are opposed to the walls of said V-shaped grooves of said pulleys so as to be contacted with said grooves, a back plate portion which transversely extends between said opposed side surfaces, a concave portion which is formed on one side of said back plate portion, surrounded by said side surfaces, and a ring supporting portion which is formed in the upper portion of said back plate portion and is provided with at least one groove for inserting said metallic ring therethrough; and an elastic member made of elastic material which is accommodated within said concave portion and fixed to one surface of said back plate portion of said block so that the surface of said elastic member is contacted with the other surface of said back plate portion of an adjacent block.

2. A torque transmission belt means according to claim 1, wherein:

said metallic ring is composed of a plurality of metallic strips which are piled up upon one another like layers.

3. A torque transmission belt means according to claim 1, wherein:

said block is formed by drawing a thin walled metallic plate.

4. A torque transmission belt means according to claim 1, wherein:

said block is made of one of compressed carbon fibers and synthetic resin including carbon fibers as filler.

5. A torque transmission belt means according to claim 1, wherein:

said elastic member is made of one of rubber and synthetic resin.

6. A torque transmission belt means according to claim 1, wherein:

said elastic member is fixed to the surface of said back plate portion, which faces said concave portion of said block; and the surface of said elastic member slightly projects from said block.

7. A torque transmission belt means according to claim 1, wherein:

said elastic member is fixed to the surface of said back plate portion, which faces said concave portion of said block;

the surface of said elastic member is on the same plane with said block; and said back plate portion is provided with an inflated portion which is contacted with the surface of said elastic member of an adjacent block.

8. A torque transmission belt means according to claim 1, wherein:

said elastic member is fixed to the surface of said back plate portion opposite to said concave portion; and said elastic member has a cross section smaller than that of said concave portion and has a thickness slightly larger than the depth of said concave portion.

9. A torque transmission belt means according to claim 4, wherein:

said block is composed of a base member comprising said side surfaces, said concave portion and said back plate portion, and a ring supporting member which is separately formed from said base member and which closely fits the upper portion of said base member;

said ring is extended through a groove which is formed between the upper surface of said base member and the lower surface of said ring supporting member.

10. A torque transmission belt means according to claim 3, wherein:

said block comprises opposed side plate portions on which said opposed side surfaces are formed respectively;

said ring supporting portion of said block is composed of a pair of side projecting portions which project from the upper portions of said side plate portions in the opposed directions to each other; and said ring is extended through a groove formed between the top surface of said back plate portion and said projecting portions.

11. A torque transmission belt means according to claim 3, wherein:

said ring supporting portion of said block is composed of a T-shaped projecting portion which project from said back plate portion upwardly to form two grooves on both sides thereof; and said ring is extended through each of said grooves between the upper surface of said back plate portion and the lower surface of said T-shaped projecting portion.

12. A torque transmission belt means according to claim 3, wherein:

said block comprises opposed side plate portions on which said opposed side surfaces are formed respectively;

said opposed side plate portions are provided with side projecting portions which project from the upper portions thereof in the opposed directions to each other;

said back plate portions are provided with back projecting portions which project upwardly from both ends thereof;

said elastic member is provided with a flange portion in the upper end thereof, which is fixed on said back projecting portions of said back plate portions by said side projecting portions of said side plate portions; and said ring is extended through a groove which is formed between the upper surface of said back plate portion and the lower surface of said flange portion of said elastic member.

* * * * *